United States Patent Office.

EDWIN L. GATES, OF WORCESTER, MASSACHUSETTS, ASSIGNOR TO THE WORCESTER WIRE COMPANY, OF SAME PLACE.

WIRE-COATING COMPOUND.

SPECIFICATION forming part of Letters Patent No. 348,391, dated August 31, 1886.

Application filed March 25, 1885. Serial No. 160,071. (No specimens.)

*To all whom it may concern:*

Be it known that I, EDWIN L. GATES, a citizen of the United States, residing at Worcester, in the county of Worcester and State of Massachusetts, have invented certain new and useful Improvements in Coating for Wire Preparatory to Drawing It; and I declare the following to be a description of my said invention, sufficiently full, clear, and exact to enable others skilled in the art to which it appertains to make and use the same.

The object of my present invention is to provide an improved bath or compound for coating for wire preliminary to drawing or passing said wire through the reducing-dies; and my invention consists in a composition mixture or bath solution composed of what wire-drawers commonly termed "flour coating" or "meal coating," (made from either wheat or rye flour,) in combination with soda-ash or carbonate of soda, and a sufficiency of water (more or less) to give the desired consistency for convenient use.

The proportional quantities of each and the several ingredients employed for compounding my improved coating for ordinary conditions of wire-drawing are preferably as follows, viz: Wheat or rye flour, fifty pounds; soda-ash, fifty pounds; water, thirty gallons. Of these ingredients the proportions may be somewhat modified to suit different conditions of work, the amount of soda-ash being increased or diminished, as required, for special kinds of wire. The flour or meal is first mixed with a part of the water, to form a paste, which may be used fresh, or, if desired, may be allowed to ferment before being used. The flour for the coating is scalded or boiled with water, and the soda-ash in fine powder, or dissolved in a portion of the water, is added and mixed therewith, also adding the requisite amount of water to form the solution. The bath is preferably used hot or at about boiling temperature. The wire is immersed in a tank or receptacle containing the bath of coating compound, which is in the condition of a comparatively thin liquor. The wire in coils, and placed upon suitable reels, may be in large bulk lowered into, immersed, and raised from the tank by lifting-cranes in usual manner.

The surplus coating quickly drips off and runs back into the tank, leaving a thin uniform coat on the wire-surfaces, but little waste occurring by dripping in the dry-house, to which the wire is transferred after immersion, and where it is kept until taken out for drawing through the dies by the ordinary process.

Among the advantages incident to my improved coating may be mentioned its economy in material, inasmuch as the coating can be used much thinner than ordinary meal or flour coatings; a saving in cost of flour is effected which is much greater than the cost of the soda-ash used, and a consequent saving results in the production of wire. The wire dries very quickly after applying the coating, thereby economizing drying-room, and rendering it practical to draw the wire very soon after coating it, which is often very desirable.

The wire can be reduced faster and farther with this coating than with the ordinary coating, the soda-ash being of lubricant nature when mixed with the flour or meal makes a superior lubricative coating, and wire coated with the mixture will pass through the drawing-dies with less than ordinary friction. Thus the wire can be drawn with greater facility while the dies will withstand much longer wear.

I do not herein make claim, broadly, to soda-ash alone in solution, or to soda-ash in combination with lime, as a coating for wire preparatory to drawing.

What I claim as of my invention, and desire to secure by Letters Patent, is—

1. The within-described composition for coating wire preparatory to drawing, consisting of flour and soda-ash in solution with water in proportions substantially as set forth.

2. A bath for treating wire preparatory to drawing, containing soda-ash or carbonate of soda, in combination with flour coating in solution, substantially as hereinbefore specified.

Witness my hand this 23d day of March, A. D. 1885.

EDWIN L. GATES.

Witnesses:
CHAS. H. BURLEIGH,
EDNA I. TYLER.